Figure 1:
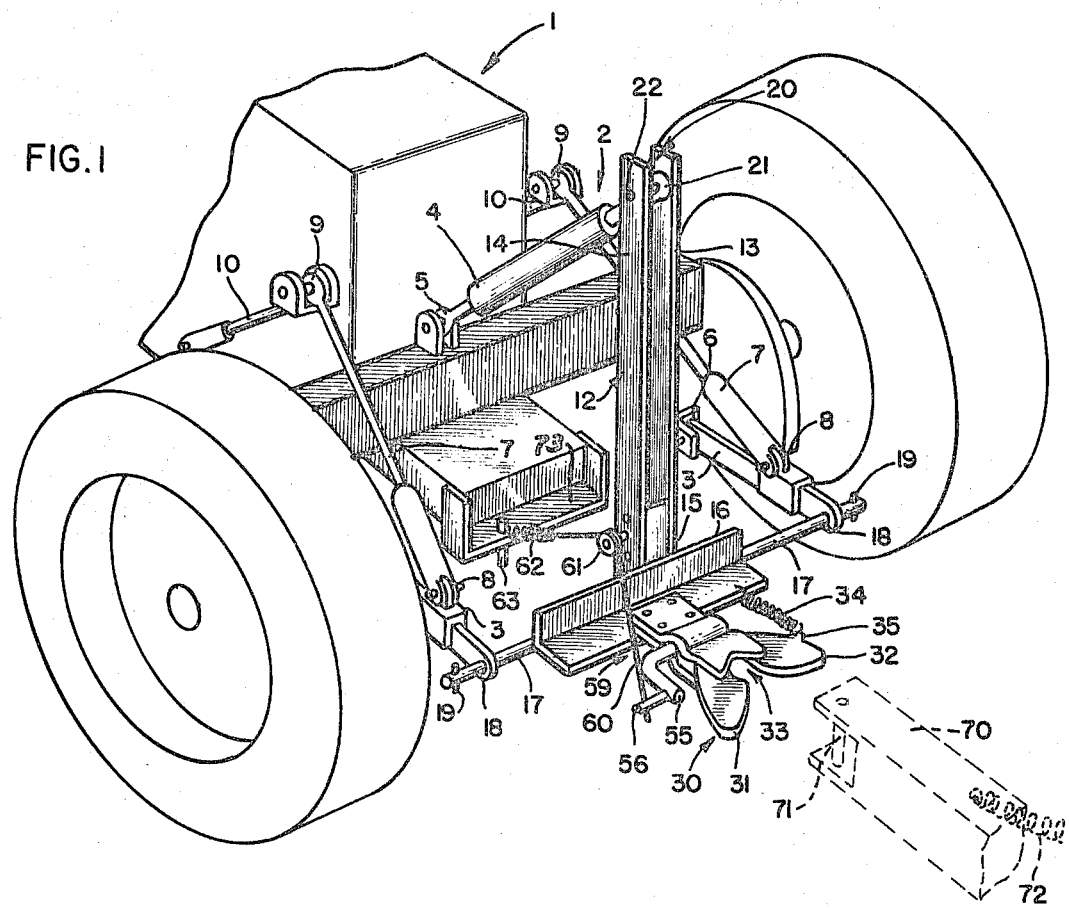

United States Patent

[11] 3,542,399

[72] Inventor Richard C. Myers,
R.R. 1, Blue Mound, Illinois 62513
[21] Appl. No. 742,842
[22] Filed July 5, 1968
[45] Patented Nov. 24, 1970

[54] TRACTOR IMPLEMENT HITCH
10 Claims, 2 Drawing Figs.

[52] U.S. Cl. .................................................. 280/479,
280/461, 172/275, 280/415
[51] Int. Cl. ...................................................... B60d 1/04
[50] Field of Search .......................................... 280/479,
415, 461, 460; 172/275

[56] References Cited
UNITED STATES PATENTS

| | | | |
|---|---|---|---|
| 2,996,127 | 8/1961 | Dunn | 172/275 |
| 3,260,386 | 7/1966 | Engstrom | 172/275X |
| 3,266,817 | 8/1966 | Engstrom | 280/461 |
| 3,347,564 | 8/1967 | Snoozy | 280/479 |
| 3,421,779 | 1/1969 | Shelby | 280/479 |

*Primary Examiner*—Leo Friaglia
*Attorney*—David V. Munnis

ABSTRACT: Implement hitch attachment for an assembly including a three-point hitch having an implement coupling device operative in response to vertical movement of the hitch.

Patented Nov. 24, 1970

3,542,399

INVENTOR
Richard C. Myers

ATTY.

TRACTOR IMPLEMENT HITCH

DISCLOSURE OF THE INVENTION

This invention relates to an improved implement hitch and more specifically to an improved implement hitch attachment adapted for use in conjunction with the customary three-point suspension type of farming tractor implement hitch.

Farming tractors of recent vintage generally have mounted in their rear a hitching means commonly referred to as a "three-point hitch". Hitches of this type, exemplified by those shown in U.S. Pat. Nos. 2,702,501 and 3,151,885, generally comprise two spaced lower connection elements positioned in essentially a common horizontal plane and a third upper connection element located above and between the two lower connection elements. The three connection elements, e.g. clamps, pin-receiving holes, slots, and the like, are adapted to engage and form rigid connections with cooperating connecting elements, e.g. linking pins, located on implements, and are mounted on one or more rearwardly extending support members. The support member or members are operatively connected to the tractor drive, e.g. through a rockshaft, so that the three connection elements of the three-point hitch can be raised or lowered as a unit. A common hitch of this design has the three connecting elements mounted on separate arms, the two lower arms sometimes being called the "draft links" and the upper arm the "center link" of the hitch. The design, mode of operation, and size of the connection elements of three-point hitches can vary over a relatively wide range. To gain a wider range of hitching capability with a given three-point hitch, the hitch, if desired, may be fitted with removable adaptors which substitute for the original connecting elements others of differing size or type of operation. As employed herein, the phrase "three-point hitch" is intended to include hitches having such adaptors.

A three-point hitch is advantageous since it provides a means, through the raising and lowering of the hitch, whereby certain implements can be connected to and detached from the tractor without the tractor operator leaving the tractor seat. Such hitches, however, have achieve limited success as hitches for towed or drawn implements such as wagons wherein essentially no load transfer is involved in connecting and pulling the load. These implements, heretofore, were recommended to be hitched to the tractor only at the tractor drawbar. Coupling and uncoupling from such implements, hence, has required either the tractor operator to dismount or the assistance of a second person in general practice.

Accordingly, the primary object of this invention is to provide a novel tractor hitch assemblage including an attachment useful with a conventional three-point hitch.

A particular object of the invention is to provide a tractor hitch assemblage, including a three-point hitch, which is of simple and inexpensive construction and which easily allows the conventional tractor having a three-point hitch to be readily attached to and disconnected from the so-called "towed" or "drawn" implements by the tractor operator alone and without him leaving the tractor seat.

These and other objects of the invention will be apparent from the description which follows.

Generally described, the present invention consists of an attachment for a three-point tractor hitch comprising a three dimensionally-rigid frame member on which are positioned elements for fixedly connecting said frame member to a three-point hitch, a coupling device fixedly mounted on said frame member, said coupling device having clamping elements which are moved together to engage one another to close said coupling device and which separate to define an opening therebetween for receiving an elongate hitching element of an implement, means for opening said coupling device, and means for closing said coupling device, said coupling device closing means being responsive to force applied to it by said elongate hitching element of said implement, said coupling device opening means including a trip member attachable to a stationary support member of the tractor and adapted to bring to bear a directional force and thereby actuate a release mechanism in said coupling device in response to the raising or lowering of said frame member.

Figure 2:
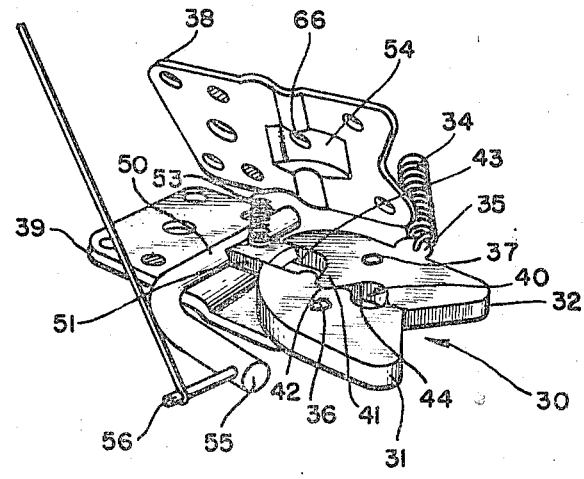

A preferred embodiment of the invention is disclosed by way of example in the following description made with reference to the attached drawings of which FIG. 1 is a perspective view of the hitch assemblage; and FIG. 2 is a perspective view of the coupling device of the preferred hitch assemblage with the cover in disassembled relationship to the remainder of the structure.

Referring to FIG. 1, a tractor generally designated numeral 1 is adapted with a conventional rearwardly extending three-point suspension hitch generally designated 2. Three-point hitch 2 comprises lower draft links 3 and upper link arm 4 located above and essentially between draft links 3. Upper link arm 4 is pivotally attached to tractor 1 at 5 and lower draft links 3 are pivotally connected at 6. Lift links 7 are pivotally attached to draft links 3 at 8 and similarly connected at their other ends at 9 to a hydraulically operated rockshaft 10 of tractor 1. Rotation of the rockshaft 10, by manipulation of controls (not shown) on the panel of the tractor of the operator, raises or lowers hitch 2.

Fixedly attached to three-point hitch 2 is a three-dimensionally rigid frame member designated generally numeral 12. Frame member 12 is generally T-shaped and comprises a vertical element defined by spaced parallel plates 13 and 14 fixed at 15 to a horizontal element formed by plate 16 and bar 17 attached thereto. The ends of bar 17 extend beyond the edges of plate 16 and are adapted with lock pins 19 which fixedly connect the ends of bar 17 in openings the ends of draft links 3. A clam 21 disposed on the end of upper link 3 fits into a slot 20 formed between spaced vertical plates 13 and 14 and fixedly engages a pin 22 anchored in the vertical plates. The rigid connection of frame member 12 to three-point hitch 2 allows member 12 to be raised or lowered by the customary operation of hitch 2.

A coupling device generally designated number 30 is fixedly mounted on horizontal plate 16 of hitch frame member 12. Referring also to FIG 2, coupler 30 in general consists of two opposing clamping members defined by jaws 31 and 32. Jaws 31 and 32 form, when coupling device 30 is in the open position as shown in FIG. 1, an opening 33 for receiving an elongate hitching element of an implement. As shown by dotted lines in FIG. 1, such a hitching element typically is a vertically disposed hitching pin 71 mounted at the end of a tongue 70 of an implement. Hitches of this type require that the clamping elements of the tractor hitch be suitably disposed (i.e. substantially horizontally) to engage the implement hitching element.

Problems heretofore encountered resulting from a premature closing of clamping elements due to collision of the clamping elements with stalks, field stubble, etc., are overcome by adapting coupling device 30 with means, here shown as spring 34, biasing it toward the open position. Spring 34 is anchored at one end to horizontal plate element 16 of frame member 12 and fixed at its other end by eyelet 35 to jaw 32.

Jaws 31 and 32 of coupler 30 are arranged in side-by-side generally horizontally coplanar relation to each other and pivot about vertical axes passing through bolt connections 36 and 37, respectively, which also hold the jaws within a shell casing formed by upper shell casing 38 and lower shell casing 39. Forward of axes 36 and 37, the jaws 31 and 32 are cutaway at the inside surface such that when they are closed in abutting relationship an opening 40 is defined within the clamping surfaces to receive and retain a vertical elongate hitching member of an implement such as pin 71 shown in FIG. 1. The inside surfaces of jaws 31 and 32 are also cutaway at the end portions thereof rearward of axes 36 and 37. When the front portions of jaws 31 and 32 are closed and engaging, the rearward end portions of the jaws are spaced apart and define a rearward-facing opening 43. Intermediate their front end portions, the inside surfaces of the jaws 31 and 32 are cooperatively intergeared or in mesh as shown at 42 such that the lateral movement of one jaw about its axis causes a corresponding (opening or closing) movement of the other jaw.

Jaw 32 has positioned on the inside surface thereof the essential element of the means employed in the embodiment depicted for closing the coupler jaws. This element is a protrusion 41 having a contour and being positioned with regard to jaw pivot 37 such that a horizontal force applied to the leading edge 44 of protrusion member 41 causes jaw 32 (and consequently jaw 31 also) to move inwardly. Sufficient force against protrusion 41 closes the forward ends of jaws 31 and 32 in abutting relationship. This arrangement allows a vehicle equipped with the present hitch to be backed into contact with a coupler pin, such as pin 71 shown in FIG. 1, of a stationary implement and the force exerted by the coupler pin automatically will close jaws 31 and 32.

Latch means for locking and unlocking jaws of coupler 30 includes a cylinder rockshaft 50 positioned transverse and adjacent to the rear ends of jaws 31 and 32 and pivotally mounted about a horizontal axis between upper shell casing 38 and lower shell casing 39. A tongue member 51 extends laterally forward from rockshaft 50 and is adapted, when the front end of jaws 31 and 32 are in a completely closed (engaged) position, to fit into slot opening 43 between the rear ends of the jaws. When positioned within slot opening 43, tongue member 51 abuts the inside surfaces of the jaws, thereby locking coupler 30 in the closed position by precluding outward lateral pivoting of the front ends of the jaws. A spring 53 is mounted on the upper surface of tongue member 51 biasing it downwardly toward the locking position. An operating lever 55 connected to rockshaft 50 at substantially right angles thereto extends exteriorly of the coupler housing. A raising of lever 55 lifts tongue member 51 out of cutaway slot 43 between jaws 31 and 32 and releases the jaws for lateral movement. When this occurs biasing spring 34 opens the coupler jaws. With jaws 31 and 32 open, the end portions thereof move together and close opening 43. The free end of tongue member 51 is maintained at a position above the surface of the jaws when the coupler is open. Space for vertical movement of the free end of tongue member 51 within the coupler housing is provided by a domed recess formed in upper shell casing 38 alined for receipt of the swinging end of member 51. Tongue member biasing means 53 seats in a recess 66 located in the recess 54. A coupler of the design represented by coupler 30 is shown in U.S. Pat. No. 2,798,741.

Means for actuating the release mechanism of coupler 30 and opening the coupler when closed includes a coupler latch trip member which brings to bear and exists a directional actuating force, on the coupler release means when the three-point hitch is raised or lowered to a predetermined position, which position is usually near one of the outside limits of the stroke of travel of the three-point hitch mechanism. In the embodiment shown the trip element for the coupler release mechanism is a flexible cord means designated generally by numeral 59 and formed by cable 60 and spring 62 connected end-to-end. Spring 62 is not a necessary element in this arrangement but it is preferred for use since it provides some leeway against damaging the coupler latch due to over-traveling the three-point hitch. Cord means 59 is fastened at one end at 56 to latch release lever 55, passes through a guide means therefore, here represented by pulley 61 mounted on frame 12, and anchored at its other end by bolt 63 to a stationary support member, drawbar 73 of tractor 1. Pulley 61 is appropriately positioned and functions to guide cord 59 along a path such that, when cord 59 is taut, the force cord 59 brings to bear on coupler release arm 55 is appropriately directional to, is of sufficient magnitude, cause arm 55 to be raised. Trip cord 59 having a given length, operative attachment of coupler release arm 55 to drawbar 73, a stationary support on tractor, through the trip member 59, fixes a position in the upward stroke of the three-point hitch at which trip cord 59 will be pulled taut and exert sufficient tension on lever 55 to raise it, actuating the release mechanism of coupler 30, and the opening jaws 31 and 32 for release of any implement connected to the hitch. The particular height in the three-point hitch's stroke at which the release mechanism is tripped depends upon the effective length of cord trip member 59. This may or may not be the actual length of the cord member 59. The more suitable cord members are substantially inextensible along their length but exhibit some degree of elasticity, such as the cable-spring arrangement of the embodiment shown.

After an uncoupling has been made, to return the hitch to a condition where coupling is possible, all that is necessary is to eliminate the actuating tension on the coupler release mechanism, i.e. loosen the flexible trip member, by raising or lowering the three-point hitch.

In summarizing how the instant hitch arrangement works, tractor 1 is maneuvered, by backing up, to laterally aline coupler 30 with the vertical hitching pin 71 on the tongue 70 of an implement (not shown). Tongue 70 is supported a short distance above the ground level by a conventional "tongue-float", here shown as spring 72 located on its upperside. The operator of the tractor then uses the three point hitch system to aline coupler 30 horizontally with pin 71. In this position, cord member 59 is loose and jaws 31 and 32 of coupler 30 are held open by biasing means 34. The tractor then is backed up to force pin 71 between jaws 31 and 32 and against surface 44 of the protrusion member 41. This pivots the front ends of jaws 31 and 32 together enclosing pin 71 within opening 40, the same pivoting of jaws 31 and 32 moves the back ends of the jaws apart forming cutout opening 43. Spring 53 forces tongue member 51 downwardly into opening 43 locking jaws 31 and 32 in the closed position.

When it is desired to disconnect the implement 70 from the tractor, coupler 30 and the frame 12 are raised by energizing three-point hitch 2. As hitch 2 rises, cord member 59 becomes increasingly tighter. Finally a height is reached at which cord member 59 exerts sufficient tension on latch lever 55 to raise it. This, in turn, lifts tongue member 51 out of opening 43 and unlocks jaws 31 and 32 for outward lateral movement caused by jaw biasing spring means 34. The hitch can be readied for additional hitching simply by lowering the three-point hitch to loosen cord member 59.

By the use of the hitch arrangement of the present invention, drawn implement hitching and unhitching no longer presents a troublesome problem. Advantageously, it eliminates the need for either a second party or an operator leaving the tractor seat to carry out the desired connecting and disconnecting. The hitch combination moreover, is inexpensive and easy to assemble.

I claim:

1. An attachment for a three-point tractor hitch comprising a three dimensionally-rigid frame member on which are positioned elements for fixedly connecting said frame member to a three-point hitch, a coupling device fixedly mounted on said frame member, said coupling device having clamping elements which are moved together to engage one another to close said coupling device and which separate to define an opening therebetween for receiving an elongate hitching element of an implement, means for opening said coupling device, means for closing said coupling device, and latch means which locks said clamping elements when said clamping elements are moved to the closed position, said latch means being provided with a release mechanism, said coupling device closing means being responsive to force applied to it by said elongate hitching element of said implement, said coupling device opening means including a trip member attachable to a stationary support member of the tractor and adapted to actuate said release mechanism in said coupling device in response to the raising or lowering of said frame member.

2. The implement hitch attachment according to claim 1 wherein said clamping elements are disposed for connecting alinement with vertical linking elements of implements.

3. The implement hitch attachment according to claim 1 wherein said clamping elements are jaws pivotally mounted in side-by-side coplanar relation, said jaws being intergeared such that the pivoting of one jaw in one direction causes pivoting of the other jaw in the opposite direction, one of said jaws has located on its inside surface an element disposed to pivot said jaw inwardly when forced horizontally against a vertical elongate hitching member of an implement, said coupling device is provided with latch means which automatically locks said jaws when pivoted to the closed position, said latch means is provided with a release mechanism, actuatable by a tensile force thereon, and said trip member of said coupling device is disposed to operatively engage and subject said release mechanism of said latch means to an activating tensile force when said frame member is raised or lowered.

4. The implement hitch attachment according to claim 1 wherein said trip member comprises a flexible cord member having an end attached to the release mechanism of said coupling device and the other end thereof is adapted with a fastening element for anchoring said trip member to a stationary support on the tractor and means for guiding said flexible cord member into actuating engagement with said release mechanism of said latch means is positioned on said frame member.

5. The implement hitch according to claim 3 wherein said trip member comprises a flexible cord member having an end attached to the release mechanism of said coupling device and the other end thereof is adapted with a fastening element for anchoring said trip member to a stationary support on the tractor and means for guiding said flexible cord member into actuating engagement with said release mechanism of said latch means is positioned on said frame member.

6. An implement hitch assembly comprising a three-point hitch mounted on a tractor body and the attachment of claim 1 connected to said three-point hitch and said connection being such that said coupling device-bearing frame member of said attachment is connected to said three-point hitch and said trip member of said attachment is connected to said tractor body.

7. The implement hitch assembly according to claim 6 wherein said clamping elements of said coupling device are disposed for connecting alinement with vertical linking elements of implements.

8. The implement hitch assembly according to claim 6 wherein said clamping elements are jaws pivotally mounted in side-by-side coplanar relation, said jaws being intergeared such that the pivoting of one jaw in one direction causes pivoting of the other jaw in the opposite direction, one of said jaws has located on its inside surface an element disposed to pivot said jaw inwardly when forced horizontally against a vertical elongate hitching member of an implement, said coupling device is provided with latch means which automatically locks said jaws when pivoted to the closed position, said latch means is provided with a release mechanism, actuatable by a tensile force thereon, and said trip member of said coupling device is disposed to operatively engage and subject said release mechanism of said latch means to an activating tensile force when said frame member is raised or lowered.

9. The implement hitch assembly according to claim 6 wherein said trip member of said attachment comprises a flexible cord member, said assembly includes means for attaching one end of said cord member to the release mechanism of said coupling device and the other end of said cord member to a stationary portion of said tractor body and means for guiding said flexible cord member into actuating engagement with said release mechanism of said latch means is positioned on said frame member.

10. The implement hitch assembly according to claim 8 wherein said trip member of said attachment comprises a flexible cord member, said assembly includes means for attaching one end of said cord member to the release mechanism of said coupling device and the other end of said cord member to a stationary portion of said tractor body and means for guiding said flexible cord member into actuating engagement with said release mechanism of said latch means is positioned on said frame member.